L. E. WHITAKER.
WEEDER AND HOE.
APPLICATION FILED OCT. 21, 1910.
998,661.
Patented July 25, 1911.
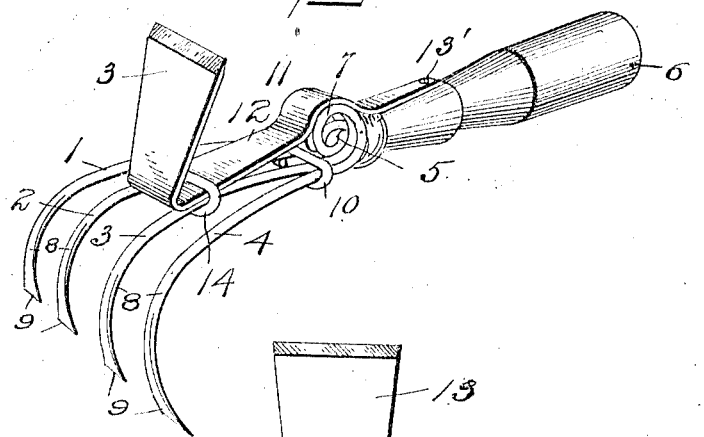
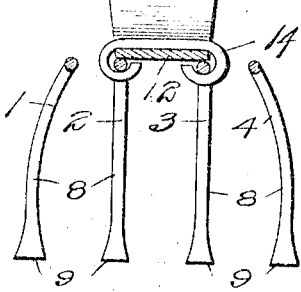
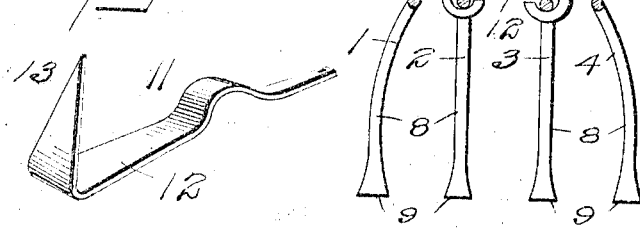
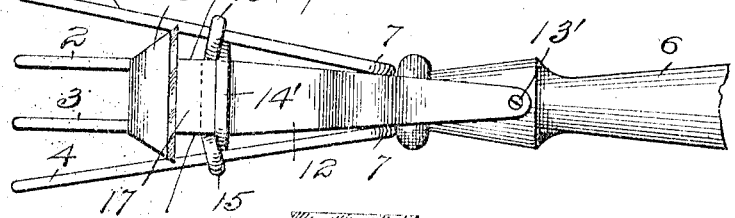
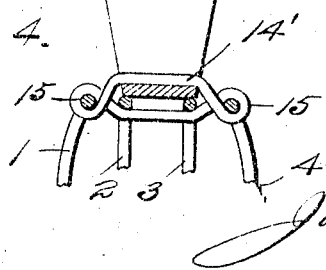
Witnesses
Inventor
L. E. Whitaker
His Attorney

UNITED STATES PATENT OFFICE.

LEWIS E. WHITAKER, OF SUSSEX, NEW JERSEY.

WEEDER AND HOE.

998,661.  Specification of Letters Patent.  Patented July 25, 1911.

Application filed October 21, 1910. Serial No. 588,292.

*To all whom it may concern:*

Be it known that I, LEWIS E. WHITAKER, a citizen of the United States, residing at Sussex, in the State of New Jersey, have invented certain new and useful Improvements in Weeders and Hoes, of which the following is a specification.

This invention relates to new and useful improvements in weeders and hoes more particularly adapted for garden purposes, the present invention being more especially designed as an improvement on the implement shown in a former patent granted to me on June 4/07, No. 855,547.

With the foregoing and other objects in view, the invention consists in the novel features of construction, combination and arrangement of parts illustrated in the drawings and more particularly pointed out in the appended claims.

In the accompanying drawings:—Figure 1 is a perspective view of the device, showing the present improvements. Fig. 2 is a transverse section thereof, looking forwardly. Fig. 3 is a plan view of a modified form of the device. Fig. 4 is a transverse section of Fig. 3, and Fig. 5 is a detail perspective view of a modified form of cutter.

Referring to the drawings for a more particular description of the device and which drawings are for illustrative purposes only and are therefore not drawn to scale, the device shown in Figs. 1 and 2, is formed of a series of wires 1, 2, 3 and 4, which are twisted together in the manner shown to form a shank 5. The shank 5 thus formed is fitted or driven into the socketed end of the handle 6, and at a point adjoining the projecting end of the shank, the wires are bent up in pairs to form obliquely disposed coils 7, the ends of which are extended forwardly and bent downwardly to form the tines 8, which terminate in flattened extremities 9.

As formed, the tines tend to separate and are held equi-distances apart by the sliding link 10, which may be slid forwardly from the position shown in Fig. 1, to draw the tines together in pairs to serve as cutters, in chopping weeds, cutting, etc.

It is to be understood that the device may be equipped with five or more tines and with a long or short handle, as desired.

The device further comprises the cutter 11, which is formed from a single strip of flat metal and comprises the tapering shank or attaching portion 12 and the cutting head 13. The cutter 11 is arranged in position with its cutting head or portion 13 extending in a direction away from the rake, by virtue of which the working portion of either member of the device may be conveniently used by merely turning the tool on one side or the other, and without the adjustment of any of its parts.

The cutter is attached in position by a fastening screw $13^1$ extending through the inner end of the shank 12 of the same and screwing into the handle 6 and the keeper 14 which embraces the outer end of the shank and the intermediate pair of wires of the rake. It will be observed that the link 14 not only acts as a keeper for the outer end of the shank but also as a brace for the intermediate pair of wires.

The cutting head 13 of the cutter may be made substantially square, as shown in Figs. 1 to 4, inclusive, or, pointed, as shown in Fig. 5.

In the modified form of the invention illustrated in Figs. 3 and 4, the keeper $14^1$ not only embraces the intermediate pair of wires and the shank of the cutter, but is coiled, as at 15, around the outer wires 1 and 4. When the implement is made in this form, the link 10 may be dispensed with, as the link $14^1$ not only acts as an effectual brace for all of the wires but will act to draw the wires together in pairs by sliding it forwardly upon the shank of the cutter. To facilitate the sliding of the link $14^1$ forwardly upon the shank of the cutter, the edges 16 of the outer end portion 17 thereof are made straight, as indicated in Fig. 3.

From the foregoing description taken in connection with the drawings, it is thought that the construction and operation of the invention will be readily understood without requiring a more extended explanation.

Various changes in the form, proportions and minor details of construction may be resorted to without departing from the principle or sacrificing any of the advantages of this invention as defined in the appended claims.

Having described my invention, what I claim as new, is:—

1. A garden implement of the class described comprising a handle, a rake comprising a series of tines, connected therewith, a cutter attached to the handle and rake with its cutting head extending in a direction away from the latter and attaching means for the cutter comprising a link extending across and embracing the intermediate tines of the rake and the shank of the cutter, said link also acting as a brace for the aforementioned tines.

2. A tool of the class described comprising a handle, a rake comprising a series of outwardly diverging tines, connected therewith, a cutter attached to the handle and rake with its cutting head extending in a direction away from the latter, attaching means for the cutter comprising a link embracing the intermediate tines of the rake and the shank of the cutter and a second sliding link for drawing the tines together in pairs when the rake is to be used for chopping or cutting purposes.

3. A garden implement of the class described comprising a handle, a series of tines, connected therewith, a cutter comprising a tapering shank and a cutting head, attached to the handle and tines with its cutting head extending in a direction at right angles away from the latter and attaching means for the cutter comprising a link extending across and embracing the intermediate tines of the rake and the shank of the cutter, said link also acting as a brace for the aforementioned tines.

In testimony whereof I affix my signature in presence of two witnesses.

LEWIS E. WHITAKER.

Witnesses:
H. E. WELLS,
FRED B. VANDROFF.